United States Patent [19]

Wheeler

[11] Patent Number: 4,505,627
[45] Date of Patent: Mar. 19, 1985

[54] POLYGON BOX TOOL MILLING CUTTER APPLIED TO AUTOMATIC SCREW MACHINES

[75] Inventor: Harold E. Wheeler, Athens, Pa.

[73] Assignee: The Wheeler Tool Company, Athens, Pa.

[21] Appl. No.: 452,365

[22] Filed: Dec. 22, 1982

[51] Int. Cl.³ .............................................. B23C 3/24
[52] U.S. Cl. ...................................... 409/190; 82/19; 409/111
[58] Field of Search .................. 82/19, 1.2, 18; 29/56, 29/57; 409/142, 143, 144, 200, 111, 112, 122, 123, 196, 199, 69, 70, 75, 77, 78, 190, 191, 63; 408/54; 51/90

[56] References Cited

U.S. PATENT DOCUMENTS

| | | | |
|---|---|---|---|
| 2,762,250 | 9/1956 | Auman et al. | 82/18 |
| 2,906,156 | 9/1959 | Wheeler | 82/19 |
| 3,511,121 | 5/1970 | Meyer et al. | 82/19 |
| 3,771,391 | 11/1973 | Jacks | 82/19 |
| 3,813,969 | 6/1974 | Wheeler | 82/19 |
| 3,822,618 | 7/1974 | Tomenceak | 408/54 X |
| 4,141,278 | 2/1979 | Lieser | 408/54 X |
| 4,356,669 | 11/1982 | Hoglund | 408/54 X |

Primary Examiner—William R. Briggs
Assistant Examiner—Glenn L. Webb
Attorney, Agent, or Firm—Edwin E. Greigg

[57] ABSTRACT

A cross slide contour form milling box tool which can be applied to automatic screw machines for contour form milling desired contours on the outside of a workpiece. The contour milling tool is positioned to a transverse slide to the drive axis. The transverse slide is driven by a pin and cam groove in the face of a cam so that the contour form milling tool is positioned in accordance with the shape of the cam groove. The milling cutter is positioned in the transverse slide and rotated by an auxiliary shaft which is driven by gears from the cam shaft using an Oldham coupling to rotate while reciprocating. The workpiece is rotated relative to the contour milling tour and the desired contour is form milled on the surface of the workpiece.

10 Claims, 4 Drawing Figures

POLYGON BOX TOOL MILLING CUTTER APPLIED TO AUTOMATIC SCREW MACHINES

BACKGROUND OF THE INVENTION

This invention is directed to polygon box tools and more particularly to polygon box tools which make use of a rotatably mounted milling cutter where hardness of metal or the clearance angle of the tool required to make a specific contour make milling desirable.

The invention pertains to a cam operated polygon tool in combination with a milling cutter to contour different shapes by use of an automatic screw machine. It is well known that many parts used in industry are made of bar stock and turned to shape and size before cutting off in an Automatic Screw Machine. This is done because these machines have 4–6 or 8 spindles and may be performing the operations of drilling, tapping, reaming, turning, forming, etc. simultaneously thus producing workpieces at low cost.

Very often these parts need additional milling or contouring operations to complete the workpiece and this is done as a secondary operation, such as milling a flat, or other shapes, on a conventional milling machine. This secondary operation often takes more time than the first Automatic Screw Machine operation and is expensive.

Some attempts to finish the workpieces on an Automatic Screw Machine by using Polygon Box Tools to turn flats, contours, etc. have been made. These tools such as described in U.S. Pat. No. 3,813,969 have been made with heavy reciprocating parts and the whole operation has been slowed to the speed at which the Polygon Box Tools would operate. The results have been fewer parts completely machined, thus showing little overall savings. This invention is an improvement over U.S. Pat. No. 3,813,969 which overcomes the drawbacks found in the patented device and which permits operation of the polygon box tool at the speed of the driving machine such as a screw machine for milling flats or other shapes.

Additionally, polygon box tools have been provided in which the cam used to actuate the reciprocating parts has been a simple cam capable of moving the parts in one direction only and relying on spring pressure to move the reciprocating parts back in the other direction. Such designs limit the operating speed to the spring pressure capable of maintaining the cam follower in contact with the cam face. Such a device is found in U.S. Pat. No. 3,511,121.

SUMMARY OF THE INVENTION

This invention sets forth a polygon box tool-milling cutter which will operate at the speed of the driving machine and uses a grooved face cam which enables one to use a milling cutter in combination to form different contours of a finisshed product by use of a screw machine for driving the polygon box tool and milling cutter.

In this device reciprocating parts are actuated outwardly and inwardly by a grooved face cam in the polygon box tool, giving positive control of a milling cutter operating at high speed. Also the new polygon box tool-milling cutter with 12 or more cutting flutes can contour much harder materials with deeper cuts and greater angles, producing many more parts per tool grind. The new polygon box tool-milling cutter will operate as fast as the regular set up and milling and contouring operations are performed, resulting in finished workpieces at no increase in cost over the regular automatic time of one operation.

The new Polygon Box Tool has been developed for milling the contour desired and uses a rotatably mounted cutting tool having 12 or more cutting flutes, compared to prior art devices using a single point cutting tool. This has resulted in an increase in parts machined from very few on hard material or parts with heavy cuts and extreme angles to large quantities when using the milling cutters.

It is therefore an object of this invention to provide a polygon box tool-milling cutter which makes use of parts which permit operation at the speed of the driving machine.

Another object is to make a grooved face cam which is of light weight and yet sufficiently sturdy in strength and rigidity to operate milling cutter tools at speeds of the driving machine to carry out the milling operation.

DETAILED DESCRIPTION OF THE INVENTION

Figure 4:
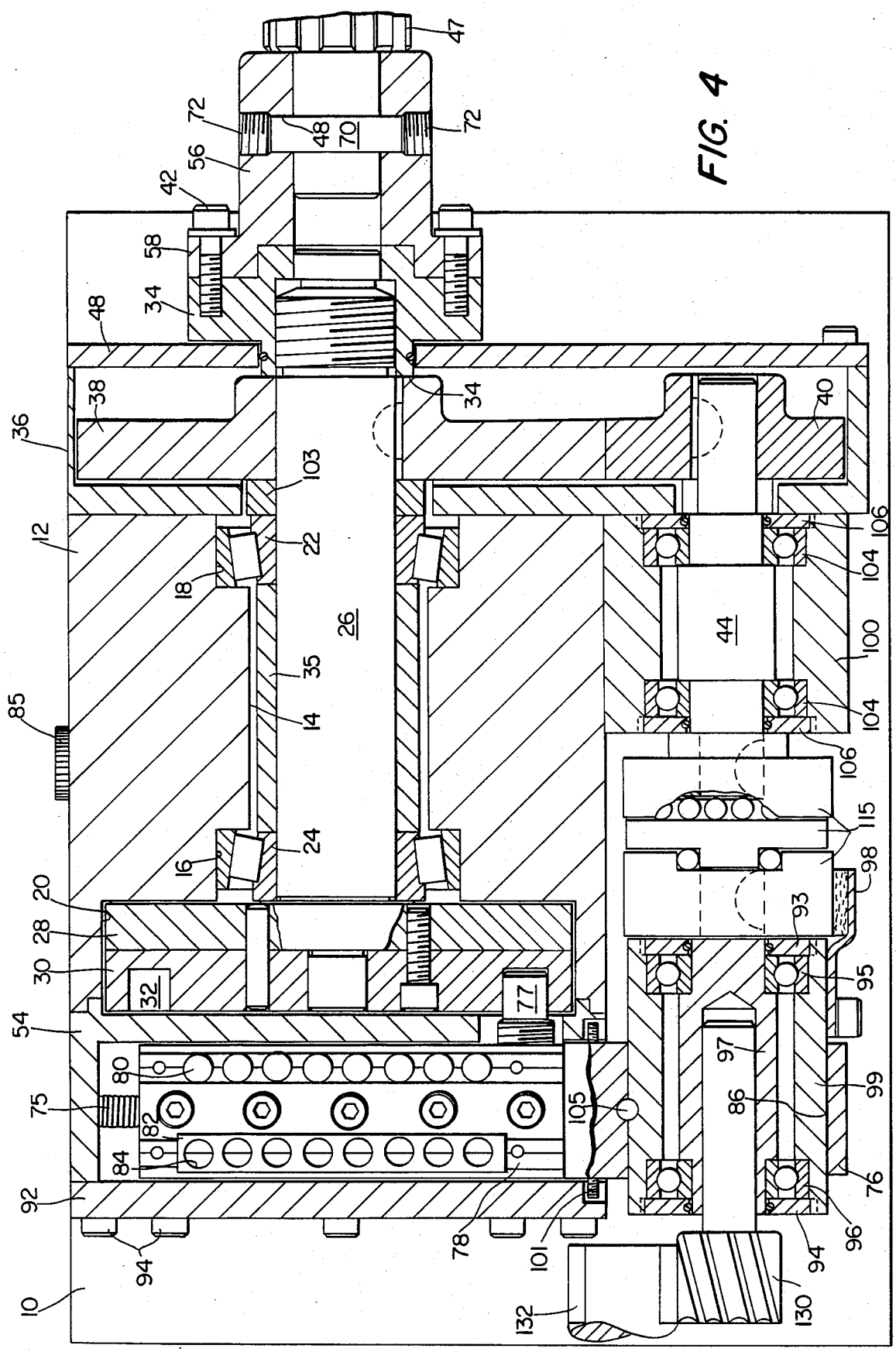
FIG. 4 shows a cross sectional view of a polygon box tool as applied to an end slide of an automatic screw machine.

Now referring to the drawings, there is shown by example a polygon box tool-milling cutter including a mounting plate 10 to which a main housing 12 is secured. The main housing is provided with an axial aperture 14 with equal diameter shoulders 16 from opposite ends and a larger diameter shoulder 20 on the front end. The shoulders 16 receive therein bearings 22 and 24 from opposite ends which are supported in well known inner and outer bearing races. The outer bearing race fits within the shoulders 16 with a tight fit and the inner bearing race fits with a tight fit on the main drive cam shaft which drives a larger diameter cam shaft end 28. The larger diameter cam shaft end 28 is secured to a cam 30 which is provided with a groove 32 in one face. The shape of the cam groove is designed so that a desired shape may be contour formed on the outside of a workpiece by use of a milling cutter. The large diameter end 28 of the cam shaft and the grooved face cam operate within the housing 12 in the area surrounded by the larger shoulder area 20 of the housing. The main drive cam shaft 26 is threaded on its end 27 and passes through the bearings in the housing 12 and threads into a threaded aperture in a front drive link 34. The drive cam shaft 26 passes through a gear housing 36 and is splined to a drive gear 38 which drives a drive gear 40 via idler gear 42. When climb milling the idler gear 42 is not used; gear 38 drives gear 40 directly, as shown in FIG. 4. Climb milling is often the preferred embodiment. The drive gear 40 is splined on and drives an auxiliary device shaft 44 which passes through the aperture 46 into the gear housing 36 to engage drive gear 40. The gear housing is closed by a gear housing cover 48. The idler gear 42 rotates an idler gear shaft 50. The main drive cam shaft 26 extends through an aperture 52 in housing cover 48 to thread into a front drive link 34. The front drive link 34 is pulled toward the drive gear 38 as the main cam drive shaft is threaded into the first front drive link until the face 54 of the front drive link is against the back surface of the drive gear 38. An o-ring seal 56 surrounds the front drive link where the face 54 passes through the housing cover.

The drive link 34 is driven by a second drive link 56 which is provided with a larger diameter end 58 which is provided with equally spaced slots 60 that extend in a circular direction. Bolts 62 pass through the slots 60 and secure the second drive 56 to the first drive link 34. The larger diameter portion of the second drive link 56 is provided with parallel lines 64 on its circumference that are measured off in degrees, and the second drive link is rotatable with respect to the first drive link so that the position of the cam relative to its drive may be changed. The second drive link is secured to the end 66 of a universal joint drive shaft 68 by use of a shear pin 70 which passes through an aperture along a diameter of the second drive link. The shear pin may be held in place by use of threaded set screws 72, one on each end of the shear pin.

Figure 1:
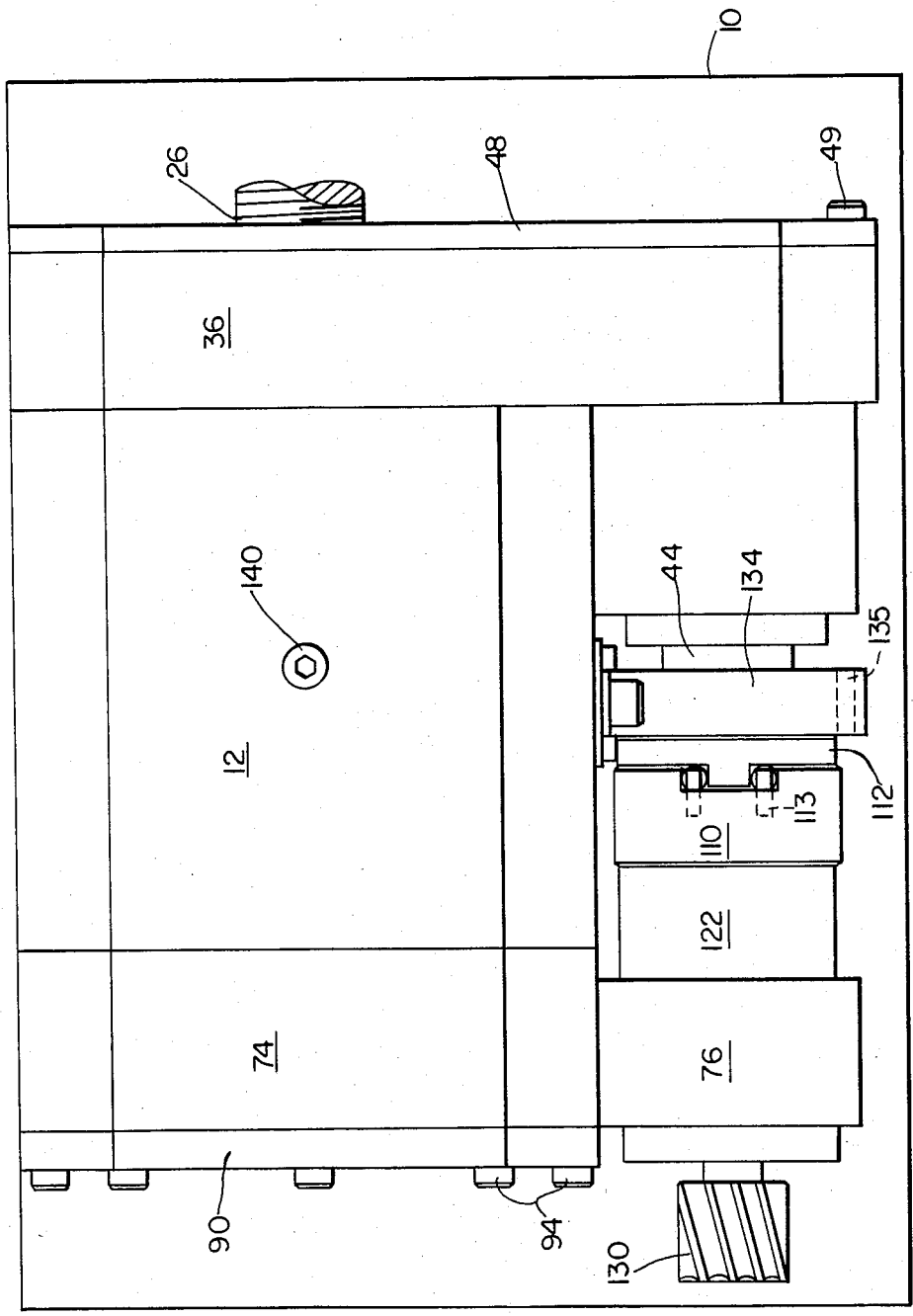
FIG. 1 is a top view of the polygon box tool-milling cutter.
Figure 2:
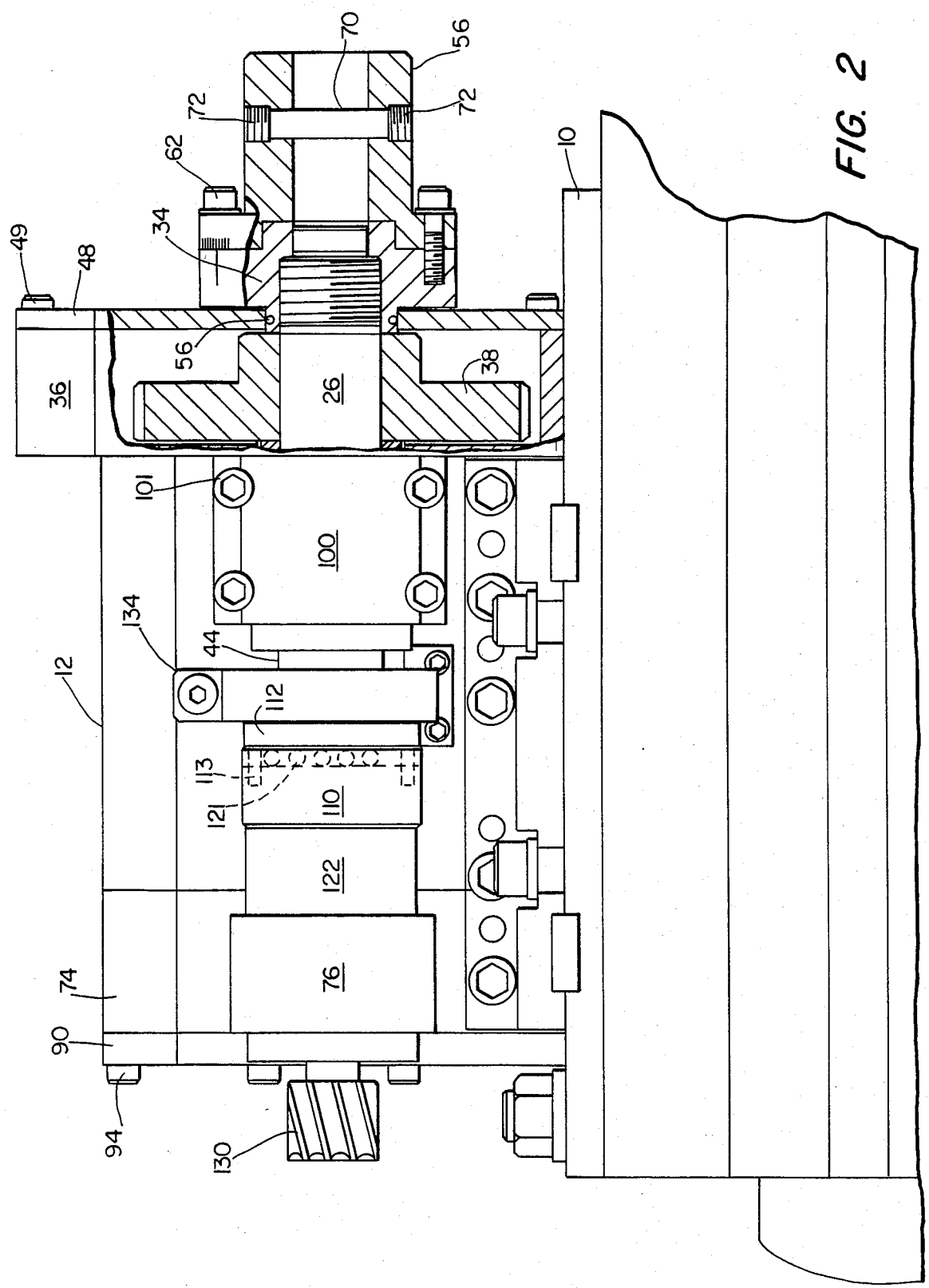
FIG. 2 is a side view of the device.

A front housing 74 is secured to the housing 12 and supports therein a transverse slide 76 which is longer in length than the front housing so that an end portion extends therefrom. The transverse slide is provided with V-shaped side grooves 78 along which ball bearings 80 are secured by use of supports 82 which are provided with apertures 84 within which each of the ball bearings rests. The transverse slide 76 fits within the front housing 74 and is provided with a cam follower pin 77 which extends into the cam groove 32. The pin is secured to the transverse slide by any suitable means such as a set screw 79. As the cam 32 is rotated by the drive shaft 26, drive links 34 and 56, and cam drive 28, the transverse slide will reciprocate in a horizontal plane, if positioned as shown in FIG. 2. Therefore, it is obvious that the operating length of the transverse slide within housing 74 is of a length which is less than the length of front housing 74 to permit reciprocating movement of the slide within the housing. Extension springs 75 are provided at the top of the transverse slide for the form milling contour operation. The extension springs 75 are secured at one end to the end housing 74 and at their other end to the transverse slide 76. The springs are provided to counteract rotational forces of the contour milling cutter. The transverse slide is provided with a cylindrical aperture 86 in the extended end portion that extends from the front housing 74. A front cover 90 encloses the transverse slide housing on its end and is provided with apertures 92 for securing the coverplate to the housing 74 by bolts 94. The bolts 94 are also used to secure housing 74 to the main housing 12.

The automatic screw machine drives the main drive shaft through use of the universal joints 68. The main cam drive shaft 26 drives the cam shaft drive 28 to rotate the cam which reciprocates the transverse slide 76 as the cam is rotated. The main drive shaft also drives the drive gear 38 which in turn drives the auxiliary drive shaft gear 40, which drives the shaft 44.

An auxiliary shaft housing 100 is provided with an aperture 102 therein and secured to the housing 12 by mounting screws 101 so that the axis of the aperture 102 is on the axis of the auxiliary drive shaft 44. The auxiliary shaft 44 is supported in the auxiliary housing 100 by bearings 104. The bearings 104 are secured in the housing by use of threaded bearing nuts 106. One end of the auxiliary shaft 44 passes into gear housing 36 and is splined to the auxiliary drive gear 40. The opposite end of the auxiliary shaft 44 extends through the bearing 104 and nut 106 and is splined to one side 108 of a universal drive assembly. The splined end of the auxiliary shaft is secured to the side 108 of the universal drive assembly by use of a set screw.

The universal drive assembly includes sides 108 and 110 with a central element 112. The central element is provided with central raised portions 114 and 116 positioned at right angles to each other which interfit into cut-out sections 118 and 120 of sides 108 and 110, which are positioned at 90 degrees relative to each other. Ball bearings 121 space the central raised portions 114 and 116 from the cut-out sections 118 and 120. The end side 108 and 110 of the universal drive assembly permits relative movement with the central element 112. Stops 113 are provided to limit the movement of central element 112 relative to sides 108 and 110. These elements form an Oldham coupling 115 as shown in FIG. 4. Seal 101 prevents oil from escaping and prevents chips from getting into the area of the slide 76.

A cutter spindle housing 122 is secured in the aperture 86 in the extended end 87 and is provided with an aperture along its axis with shoulders near each end which receive bearings 124 and 126 therein. Bearing 126 is secured in the housing 122 by use of a threaded bearing nut 106. A cutter spindle 128 has one end extending into the spindle housing and the end extending from said spindle housing splined to the universal drive assembly end piece 110, which is juxtaposed the end of the spindle housing. The milling cutter connection end of the cutter spindle extends into the spindle housing so that the apertures 127 align with apertures 129 in the spindle housing and is connected to the milling cutter 130 by set screws that thread into the holes 131 in the milling cutter shaft. A workpiece 132 is shown juxtaposed the milling cutter. A brake 134 is provided with a brake band 135 which partially surrounds the universal drive assembly end 108 and is used to apply a slight pressure on the part 108 to avoid any great fluctuation in rotational speed due to any differences in work material. An oil filter hole and plug 140 are provided for injecting oil into the main housing.

Figure 3:
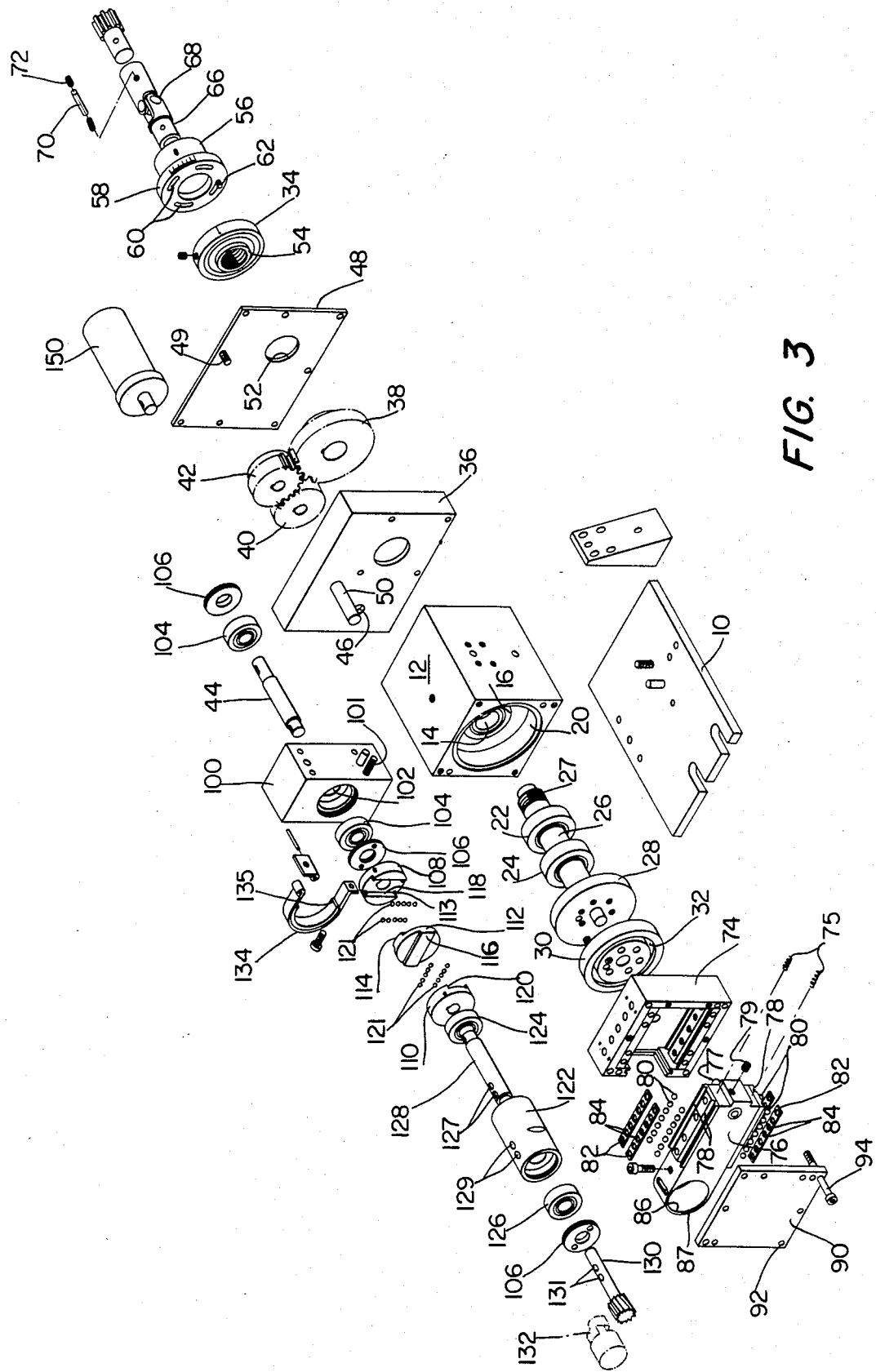
FIG. 3 is an exploded perspective view more clearly showing the relative parts of the device and a workpiece juxtaposed the milling tool.

The milling cutter can be driven by an alternative hydraulic or electric motor 150 shown in FIG. 3.

In operation for milling a piece of work, the polygon box tool-milling cutter is assembled with a groove-faced cam of desired configuration and with the cutter spindle housing secured to the transverse slide through the aperture 86. The polygon box tool-milling cutter is mounted on a side slide of an automatic screw machine and the cam shaft, milling cutter and workpiece placed in a rotatable holder are driven by the automatic screw machine drive. The workpiece holder and screw machine drive are driven at the same rotational speed. The cam of the polygon box tool will be rotated by the screw machine drive. As the cam is driven, the cam follower pin will follow the design of the cam, thereby reciprocating the transverse slide and milling cutter in a horizontal line as the cam rotates. As the cam is rotated to reciprocate the transverse slide and milling cutter in a line, the workpiece is rotated at the same rotational speed in synchronism with the screw machine drive. The milling cutter will then cut the outside area of the workpiece to form a design in accordance with the shape of the cam as the workpiece is rotated. The polygon box tool and milling cutter are moved relative to the workpiece so that the workpiece is cut along the desired length or width.

The second drive link 56 can be adjustably rotated relative to the first drive link 34 in order to change the position of the cam with respect to the drive; therefore, the orientation of the workpiece will be different subsequent to adjustment of the relative position of the cam to the drive. This allows one contour to be oriented to another contour which was produced by another polygon box tool on a previous position.

Obviously since the cam follower is in the groove on the cam face, there is no need for any additional springs because the cam follower pin will follow the groove and will be guided within the groove without the aid of springs. Thus, the transverse slide operates with less parts.

The cam shaft has been shown screw threaded into the first drive link; any other type connection may be made which would be obvious to one skilled in the art.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A polygon box tool-milling cutter comprising:
   a main housing,
   a cam having at least one face, a groove in said cam at least one face, said cam including a cam shaft rotatable in said housing,
   a front housing,
   a lightweight transverse slide in said front housing,
   a cam follower pin secured to said transverse slide and extending from said transverse housing into said groove in said cam face for reciprocating movement of said transverse slide during rotation of said cam by said cam shaft,
   an auxiliary cutter spindle housing secured to one end of said transverse slide for securing a milling cutter on one end of said transverse slide for reciprocating movement with said transverse slide, and means for rotating said milling cutter relative to a workpiece.

2. A polygon box tool-milling cutter as claimed in claim 1 which includes:
   drive means for driving said cam shaft, and
   means for adjusting said drive means angularly with respect to said cam.

3. A polygon box tool-milling cutter as claimed in claim 1 in which
   said means for rotating said milling cutter is a universal drive assembly which permits reciprocal movement of said milling cutter.

4. A polygon box tool-milling cutter as claimed in claim 3 in which
   said cam and said milling cutter are rotationally driven by a drive gear means which is driven by a power source.

5. A polygon box tool-milling cutter as claimed in claim 4 in which:
   said drive means for driving said milling cutter parallels said drive means for driving said cam.

6. A polygon box tool-milling cutter as claimed in claim 4 which includes:
   an auxiliary shaft housing secured to said main housing,
   a gear housing secured to said main housing,
   gear means in said gear housing for driving said milling cutter drive means simultaneously with driving said cam, and
   an auxiliary drive shaft in said auxiliary shaft housing which is driven by said gear means and which drives said universal drive assembly for driving said milling cutter.

7. A polygon box tool as claimed in claim 6 which includes:
   a brake that causes a constant drive force on said cutter.

8. A polygon box tool as claimed in claim 6 in which:
   said gear train includes two drive gears for climb cutting.

9. A polygon box tool as claimed in claim 6, in which:
   said cutter includes at least ten flutes.

10. A polygon box tool as claimed in claim 6, in which:
    said gear train includes two drive gears and one idler gear.

* * * * *